United States Patent [19]

Vanderwerf

[11] Patent Number: 4,986,651

[45] Date of Patent: Jan. 22, 1991

[54] OVERHEAD PROJECTOR WITH CENTERLESS FRESNEL LENS REFLECTIVE STAGE

[75] Inventor: Dennis F. Vanderwerf, St. Paul, Minn.

[73] Assignee: Minnesota Mining and Manufacturing Company, St. Paul, Minn.

[21] Appl. No.: 389,534

[22] Filed: Aug. 4, 1989

[51] Int. Cl.⁵ .......................................... G03B 21/132
[52] U.S. Cl. ............................... 353/66; 353/DIG. 4; 353/38
[58] Field of Search ............... 353/65, 66, 67, DIG. 4, 353/3, 5, 38, 69, 70, 63, 98, 99, 102, 120-122; 350/452, 613, 331 R, 345, 338, 103, 167

[56] References Cited

U.S. PATENT DOCUMENTS

| | | |
|---|---|---|
| 3,293,982 | 12/1966 | Appeldorn . |
| 3,486,817 | 12/1969 | Hubner . |
| 3,708,222 | 1/1973 | Stern ............................. 350/452 X |
| 4,204,881 | 5/1980 | McGrew ....................... 350/452 X |
| 4,206,984 | 6/1980 | Mueller . |
| 4,436,393 | 3/1984 | Vanderwerf ......................... 353/38 |

FOREIGN PATENT DOCUMENTS

| | | |
|---|---|---|
| 3410024A1 | 9/1985 | Fed. Rep. of Germany . |
| 3410024 | 9/1985 | Fed. Rep. of Germany ........ 353/64 |
| 3512466A1 | 10/1986 | Fed. Rep. of Germany . |
| 0212837 | 9/1986 | Japan ............................. 353/DIG. 3 |
| 88/02501 | 4/1988 | World Int. Prop. O. .... 353/DIG. 3 |

Primary Examiner—Harry N. Haroian
Attorney, Agent, or Firm—Kinney & Lange

[57] ABSTRACT

A reflective stage overhead projector has a light source, a projection lens and mirror assembly for focusing and reflecting an illuminated image onto a screen, and a stage area for supporting an image to be illuminated and projected. One reflective surface of the stage area is defined by a noncentral portion of a Fresnel lens.

16 Claims, 6 Drawing Sheets

OVERHEAD PROJECTOR WITH CENTERLESS FRESNEL LENS REFLECTIVE STAGE

BACKGROUND OF THE INVENTION

1. Field of the Invention.

The present invention relates to the field of optics and in particular to a reflective stage overhead projector utilizing an asymmetrical reflective supporting stage.

2. Description of the Prior Art.

Overhead projectors are in widespread use because they provide an economical and efficient method of displaying and presenting information to a large number of spectators. Overhead projectors generally have the following basic components: a base containing an asymmetrical reflective stage such as a Fresnel lens which provides support for the transparent material to be displayed; a lamp and lens combination positioned above the stage to illuminate the reflective stage; and a mirror and lens assembly through which rays of light radiating from the reflective stage are focused onto a screen.

The above components work in combination to display information contained on the transparent material to the screen. The lamp and lens combination is designed to provide an intense illumination to the reflective stage. Light radiating from the reflective stage is directed toward the mirror and lens assembly which focuses the image onto the screen.

The reflective stage is composed of two surfaces: a first planar surface and a second reflective surface which is typically formed utilizing a portion of a Fresnel lens. The type of Fresnel lens typically used in overhead projectors has a small planar center with a plurality of circular concentrically stepped setbacks which reflect illuminating light to a target point above the lens. The location of the target point will change corresponding to changes in position of the lamp and lens combination. The lamp and lens combination and the reflective surface are placed in a fixed position relative to one another such that the target point of the Fresnel lens is located at the mirror and lens assembly. Light radiating from the reflective surface travels through the transparent material and converges at the target point where the mirror and lens assembly focus the light onto the screen.

Overhead projectors utilizing the above components are disclosed, for example, in the following references:

| Country | Applicant | Reference No. |
|---|---|---|
| U.S.A | Appeldorn | 3,293,982 |
| U.S.A. | Hubner | 3,486,817 |
| U.S.A. | Mueller | 4,206,984 |
| Germany | Demolux GmbH & Co. KG | 34 10 024 A1 |
| Germany | Demolux GmbH & Co. KG | 35 12 466 A1 |

Appeldorn, Hübner and Mueller each show an overhead projector with its mirror and lens assembly located between a light source and a screen on which an image is to be projected. The Demolux references reverse the positioning of the mirror and lens assembly and the light source, such that the light source is located between the mirror and lens assembly and the screen. The light source is so positioned in Demolux reference 34 10 024 A1 to accommodate a slide projector and in Demolux 35 12 466 A1 to accommodate an auxiliary support surface.

The optical configurations utilized in the prior art have limitations which cause several problems to both the presenter (user) who views the stage area as well as to the audience which views the illumination of the projected image on the screen. One limitation is a "bright-spot" of light projected upon the screen of higher intensity than the surrounding illumination. Another limitation, termed "hot-spot," is a reflection of the lamp off of the reflective surface which presents a glare to a user of the projector.

A "bright-spot" refers to an area or spot of light on the screen of higher intensity than the surrounding illumination. As discussed above, a Fresnel lens has, on one side thereof, circular concentric setbacks which reflect illumination to a target point above the lens. Proper reflection to this target point requires that a small circular center area of the Fresnel lens be planar. The planar center area of the Fresnel lens acts as a mirror and reflects not only the illuminating light from the lamp but an image of the lamp itself. The mirror and lens assembly, viewing the lamp off of the planar surfaces of the transparent material, the first planar surface of the reflective stage and the planar center area of the Fresnel lens, forms a real image of the lamp in the space between the mirror and lens assembly and the screen. The light from the real image is projected on toward the screen where it forms a spurious defocused spot of light of higher intensity than the surrounding illumination. The spot of light is annoying to a viewing audience and causes a loss of image contrast in a region where the spot of light strikes the screen.

The "hot-spot" limitation, contrasted with the "bright-spot" problem discussed above, is not formed because of any particular characteristic of the Fresnel lens. Rather, it is a specular reflection of the lamp image off of the planar surfaces of the transparent material and the first planar surface of the reflective stage. Because of this specular reflection, a user looking at the reflective stage will see a virtual image of the lamp reflected off of these planar surfaces. This lamp image creates a glare which is annoying to the user viewing the reflective stage, causing eye strain and making presentation of material more difficult.

SUMMARY OF THE INVENTION

The overhead projector of the present invention includes a surface for supporting an image to be projected, an overhead light source to illuminate the image, and projection means for focusing and reflecting the illuminated image onto a screen. The supporting surface is defined by a portion of a Fresnel lens having its center aligned out of and spaced from the supporting surface. Thus, any light reflecting off of a center planar area of the Fresnel lens is directly reflected away from the projection means, and thereby not onto the screen.

Preferably, the illuminated image is positioned within a defined stage area of the supporting surface. A center of the Fresnel lens is positioned out of the stage area so that it is at least 20 mm from the nearest edge of the stage area.

In a preferred embodiment of the present invention the light source is positioned between the projection means and the screen. This positioning allows the image to be illuminated without presenting a glare to a user of the projector.

BRIEF DESCRIPTION OF THE INVENTION

DETAILED DESCRIPTION OF THE PREFERRED EMBODIMENTS

Figure 1:
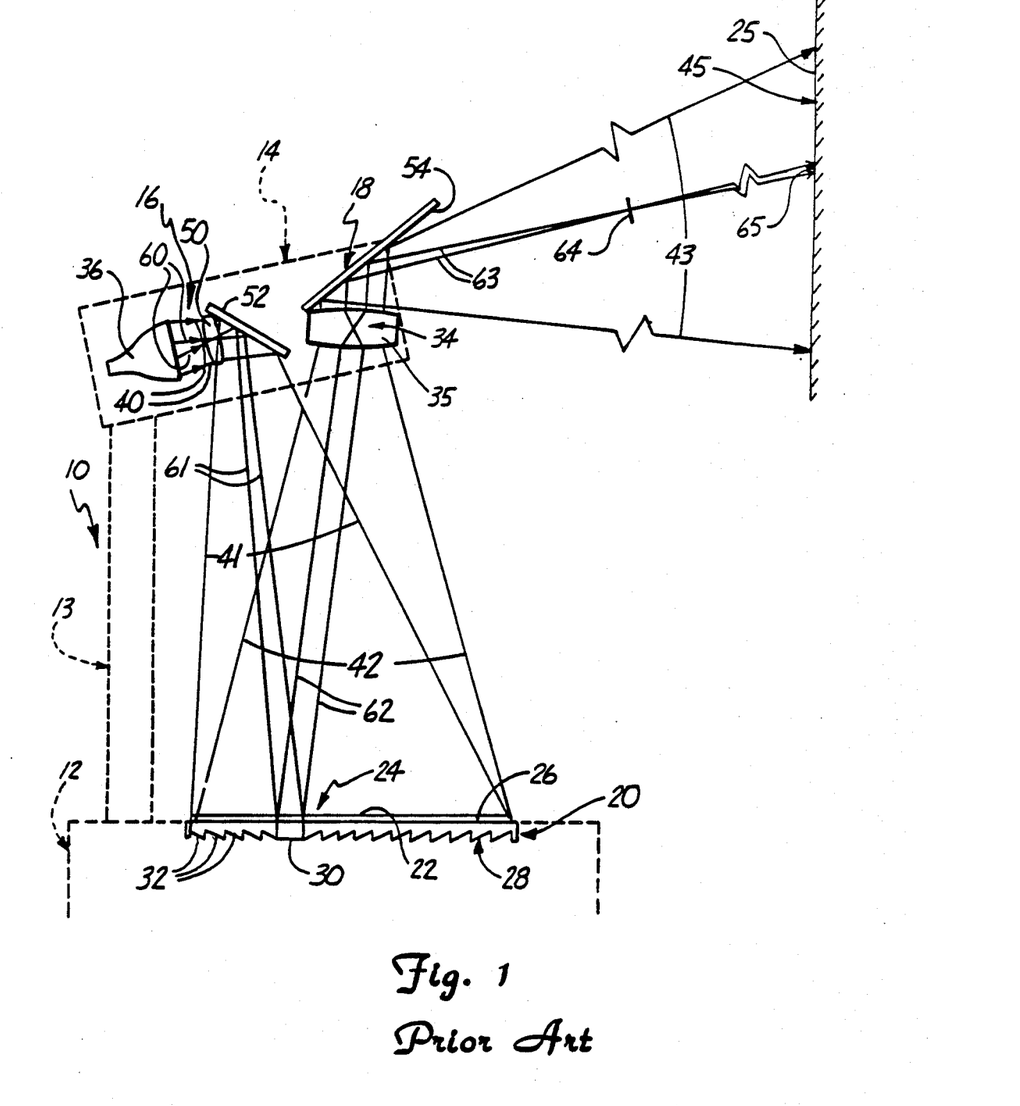
FIG. 1 is schematic representation of a prior art overhead projector, illustrating the problem of a Fresnel lens center area "bright-spot" reflection which is projected onto the screen.
Figure 2:
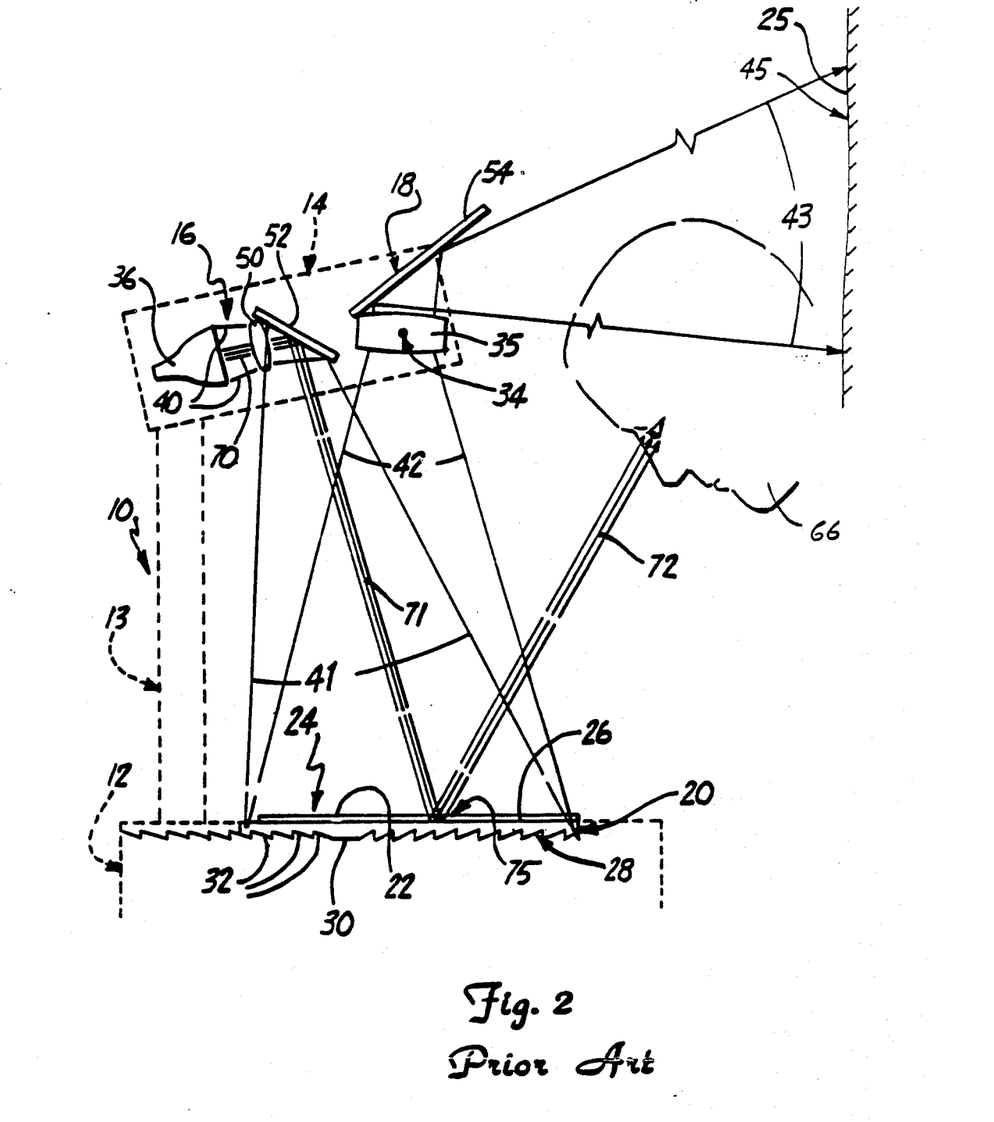
FIG. 2 is a schematic representation of a prior art overhead projector, illustrating the problem of light source image reflection off of the stage area which presents a glare to a user of the projector.

A prior art overhead projector 10 is illustrated generally in FIGS. 1 and 2. Projector 10 includes a base 12, an upright stand 13 and an overhead arm 14 attached thereto. The arm 14 supports a lamp and lens combination 16 and a mirror and lens assembly 18. The base 12 includes an asymmetrical reflective stage 20 which provides support for a transparent sheet of material (a transparency) 22 containing an image 24 to be displayed onto a screen 25.

The reflective stage 20 is composed of two surfaces: a planar surface 26 and a reflective surface 28 which is formed utilizing a portion of a Fresnel lens. The reflective surface 28 has a small planar center 30 surrounded by a plurality of circular concentrically stepped setbacks 32 which are shown sectionally in FIGS. 1 and 2, enlarged and exaggerated for clarity. The center 30 and stepped setbacks 32 of the reflective surface 28 are coated with reflective material which directs illuminating light from the lamp and lens combination 16 to a convergence point 34 within a focusing lens 35 of the mirror and lens assembly 18.

The operation of the projector 10 can be described by tracking light rays 40-43, which represent the boundaries of the image 24 contained in transparency 22, beginning as light emitting from a lamp 36 and ending as a projected image 45 on the screen 25. Lamp 36 emits light rays 40 towards the lamp and lens combination 16, which includes a directing lens 50 and a directing mirror 52. The rays 40 are directed therefrom as light rays 41 down toward the reflective stage 20. The light rays 41 illuminate the reflective surface 28 of the Fresnel lens and are reflected by the stepped setbacks 32 thereof through the transparency 22 and up as light rays 42 toward the focusing lens 35. The light rays 42 travel through the focusing lens 35 and are reflected by a tilt mirror 54 (of the mirror and lens assembly 18) toward the screen 25 as light rays 43, where the projected image 45 is thus displayed.

FIG. 1 illustrates a problem associated with a typical prior art overhead projector. As mentioned above, the reflective surface 28 contains the circular concentrically-stepped setbacks 32 of the Fresnel lens which are centered around the center 30 thereof. The reflective surface 28 is designed to project illuminating light to the converging point 34 within the focusing lens 35. The optical configuration of the lamp and lens combination 16 and the mirror and lens assembly 18 requires the center 30 of the Fresnel lens to be planar in order to properly reflect illuminating light from lamp and lens combination 16 to converging point 34. However, the small planar center 30 acts as a mirror and reflects not only the illuminating light from the lamp 36, but also a virtual image of the lamp 36.

The mirror and lens assembly 18, viewing an image of the lamp 36 off of the planar surfaces of the transparency 22, the planar surface 26 of the reflective stage 20 and the center 30, forms a real image of the lamp 36 between the tilt mirror 54 and the screen 25. Light from that real image is projected onto the screen 25 where it forms a spurious defocused spot of light ("bright-spot") of higher intensity than the surrounding illumination of the projected image 45.

For purposes of illustration, light rays 60-63 are shown in FIG. 1. Lamp 36 emits light rays 60, which are diverted downwardly by directing mirror 52 as light rays 61 onto reflective stage 20. The planar surfaces of the transparency 22, surface 26 and center 30 act as mirror-like surfaces to reflect the image up as light rays 62 toward the focusing lens 35. The light rays 62 travel through the mirror and lens assembly 18 and are projected toward the screen 25 as light rays 63. The reflected image of the lamp 36 is focused at a focal point 64, typically in front of or spaced from the screen 25. The light rays 63 continue on from the focal point 64, becoming defocused, until they strike the screen 25 at lamp image region 65. The region 65 is brighter than the surrounding projecting image, and is annoying to a viewing audience and causes a loss of image contrast in a region 65, where the light rays 63 strike the screen 25.

FIG. 2 illustrates another problem, termed "hot-spot", associated with prior art overhead projectors. Unlike the "bright-spot" illustrated in FIG. 1, a "hot-spot" is not formed because of any particular characteristic of the reflective surface 28 of the Fresnel lens. Rather, it is caused by a specular reflection of the image of the lamp 36 off of the transparency 22 and the planar surface 26 presenting a glare to a user 66 viewing the reflective stage 20.

To illustrate, consider a beam of light 70 from the lamp 36 which is diverted downward to the reflective stage 20 from the directing mirror 52 as a beam of light 71. The beam of light 71 strikes the reflective stage 20 and is reflected by the planar surfaces of the transparency 22 and the planar surface 26 of the reflective stage 20 (e.g., Fresnel lens). Thus, these surfaces, acting as mirrors, display a specular reflection of the lamp 36 (as at a specular reflection area 75 on the reflective stage 20) to the user 66 viewing the reflective stage 20. The specular reflection area 75 creates a glare which is very annoying to the user 66, causing eye fatigue and making presentation of the image 24 more difficult. To the user, the effect is that of looking directly at the lamp 36.

Figure 3:
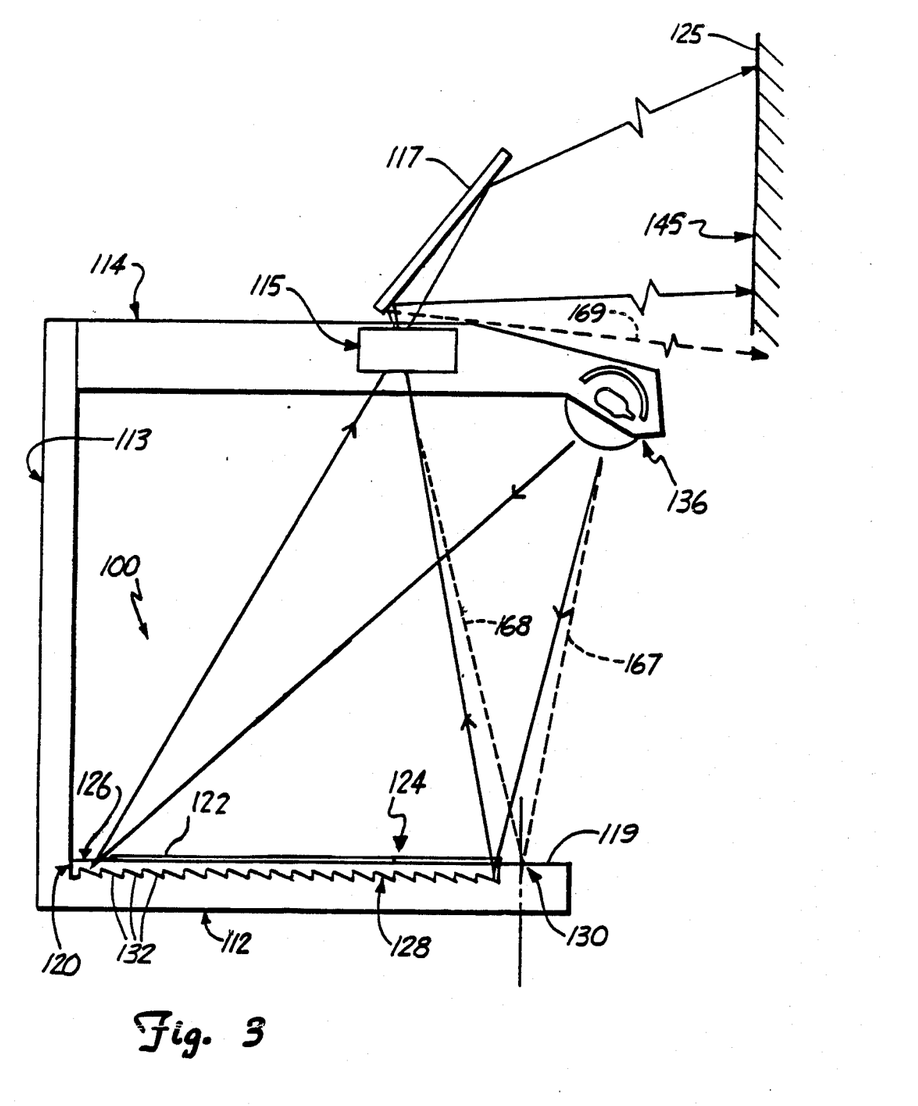
FIG. 3 is a schematic representation of an overhead projector of the present invention.
Figure 4:
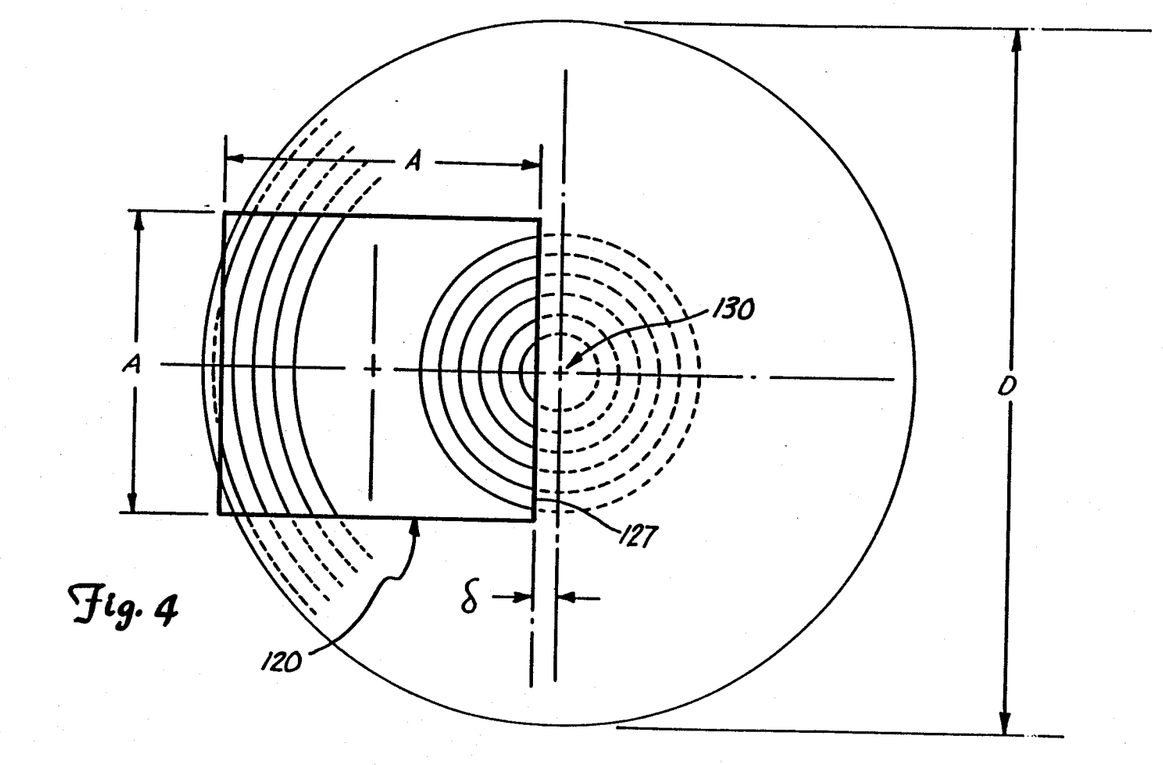
FIG. 4 is a diagramatic plan view of the stage area of an overhead projector of the present invention, illustrating its relationship to a complete Fresnel lens.
Figure 5:
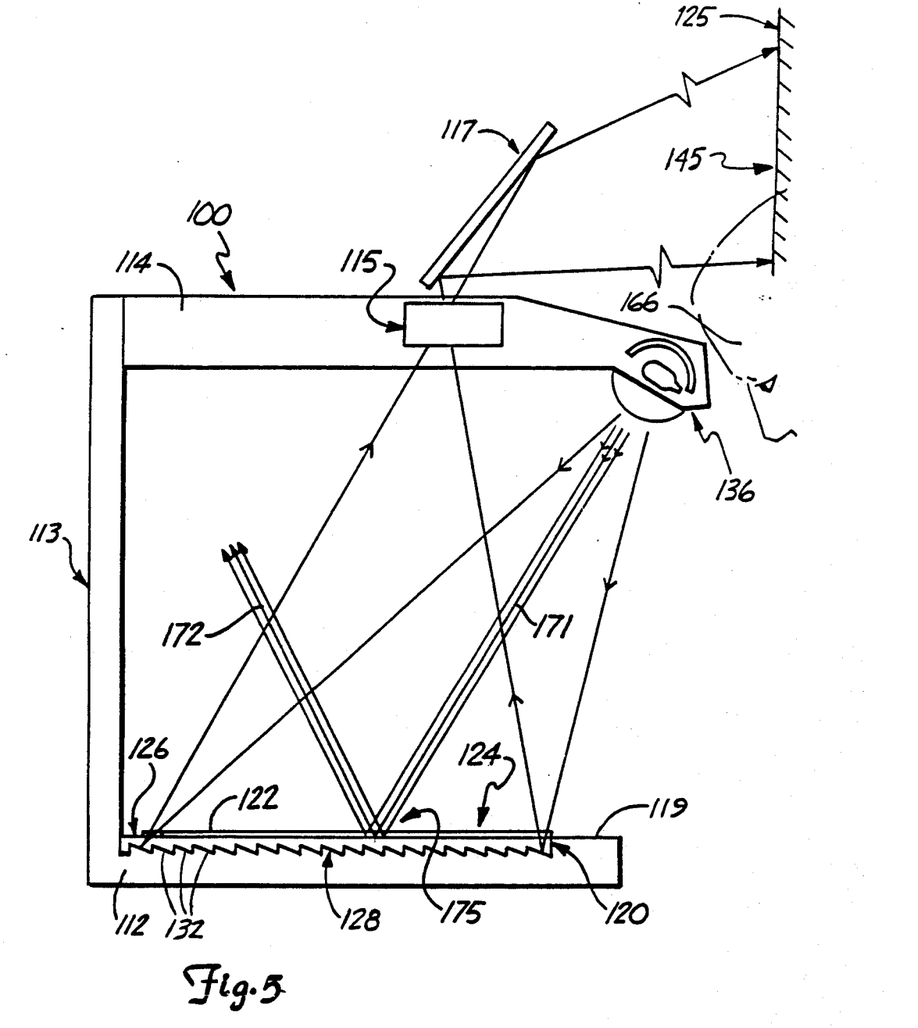
FIG. 5 is a schematic representation of an overhead projector of the present invention.
Figure 6:
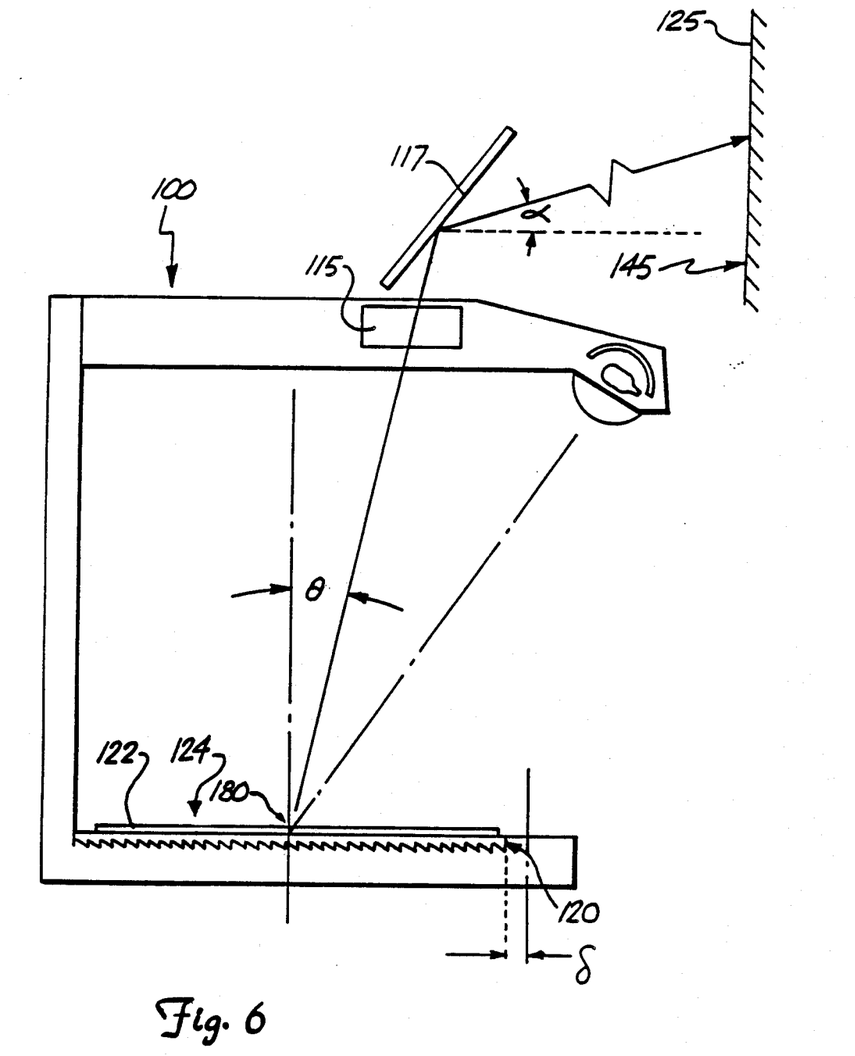
FIG. 6 is a schematic representation of an overhead projector of the present invention.

An overhead projector 100 in accordance with the present invention is illustrated generally in FIGS. 3-6. FIG. 3 shows an overhead projector arrangement which is advantageous over prior art overhead projectors in that no "bright-spot" appears on the screen. FIG. 4 shows the preferred portion of a Fresnel lens used in the inventive overhead projector of FIG. 3. FIG. 5 illustrates a second advantage over prior art overhead projectors, namely that a user or presenter 166 viewing a reflective stage 120 no longer sees a glare ("hot-spot") of a light source 136 off of the planar surfaces of the reflective stage 120 or a transparency 122. FIG. 6 illustrates that projector 100 projects a projected image 145 off a transparency 122 which is free of keystone distortion.

Projector 100 includes a base 112, a stand 113 extending upwardly from the base 112 and an arm 114 which supports a projection lens assembly 115, a tilt mirror 117 and the light source (lamp) 136. The base 112 has an upper supporting surface 119 defined by the reflective stage 120 which supports the sheet of transparent material (a transparency 122) containing information to be projected onto a screen 125.

The reflective stage 120 is defined by a Fresnel lens having a planar surface 126 and a reflective surface 128. The reflective surface 128 has a plurality of circular concentrically stepped setbacks 132 which are shown enlarged and exaggerated for clarity. The stepped setbacks 132 are coated with reflective material which direct illuminating light from the lamp 136 to the projection lens assembly 115. An image 124 is focused by the projection lens 115 onto the tilt mirror 117, which in turn directs the image 124 onto the screen 125 as a projected image 145.

The center of the Fresnel lens, indicated as at 130 in FIG. 3, is not positioned within the reflective stage 120. Moving the center 130 of the Fresnel lens from the reflective stage 120 eliminates the "bright-spot" problem associated with prior art overhead projectors.

In FIG. 3, typical light rays 167 are emitted from the light source 136, and reflected off of the circular planar center 130 of the Fresnel lens toward the projection lens 115 and tilt mirror 117 as light rays 168 which are then projected as light rays 169 onto the screen 125. In actuality, light rays 167 miss the reflective stage 120 and thus would not be correctly projected to projection lens 115 and tilt mirror 117. To illustrate, however, the light rays are shown in phantom as if the small planar center 130 of the Fresnel lens were present within the reflective stage 120. The light rays 167 strike the center 130 of the Fresnel lens and are reflected toward the projection lens 115 and tilt mirror 117 (as light rays 168) where they are subsequently reflected (as light rays 169) to an area below the screen 125. Light rays 169 do not become a part of the illumination covering the screen 125, illustrating that the problem of a "bright-spot" has been eliminated.

FIG. 4 illustrates an overhead view of the reflective stage 120, showing that portion of a Fresnel lens which defines the reflective stage 120. The reflective stage 120 is separated from the Fresnel lens center 130 by a distance δ of at least 20 mm. This is the minimum separation needed between the center 130 of the Fresnel lens and an edge 127 of the reflective stage 120 to completely eliminate the "bright-spot" in the projected image, when the reflective stage has sides a length A of 285 mm by 285 mm, and the corresponding Fresnel lens a diameter D of 660 mm. For other overhead projector configurations, the necessary minimum separation distance may change. This factor is dependent upon such details as light source, bulb size, Fresnel lens dimensions, stage size, etc. The main concern is, of course, the placement of the specular image of the light source outside of the stage.

FIG. 5 illustrates the elimination of a "hot-spot" associated with prior art overhead projectors. As previously stated, a "hot-spot" occurs when a light source is reflected off of the planar surfaces of a stage area, which cause an annoying glare to a user. Projector 100 eliminates the problem of a "hot-spot" by placing light source 136 between the screen 125 and the projection lens 115 and tilt mirror 117. While this placement does not eliminate the specular reflection of the light source 136, it does direct specular reflection harmlessly away from the user 166.

As illustrated in FIG. 5, a beam of light 171 from the lamp 136 illuminates the reflective stage 120 and is reflected off of the planar surfaces of the transparency 122 and the planar surface 126 to become a reflective light beam 172. The reflective beam 172 constitutes a specular reflection of the lamp 136 which, because of the placement of the lamp 136, is reflected harmlessly away from the user 166. As in FIG. 3, the desired light rays illuminate the image 124 on the transparency 122, are properly reflected off the reflective surface 128, through the projection lens 115, off of the tilt mirror 117 and onto the screen 125. Thus, the problem of specular reflection is eliminated while maintaining proper illumination, pickup and projection of the projected image 145.

Those skilled in the overhead projector art are familiar with keystone distortion of the projected image on the screen, which occurs when the projection lens views the stage center at an angle (relative to vertical) which is different from the angle (relative to horizontal) that the image is projected from the projection lens onto the screen. The keystone distortion problem is readily addressed with the overhead projector arrangement of the present invention.

FIG. 6 illustrates a projection angle Θ needed to project the image 124 s that it is free of keystone distortion. The angle Θ is the angle at which the projection lens 115 views a center 180 of the reflective stage 120, relative to a line perpendicular to the stage and passing through stage center 180. An angle α is the angle, relative to a line perpendicular to the screen 125, at which the center of an image contained in the transparency 122 (centered on the reflective stage 120) is projected from the tilt mirror 117 onto the screen 125. The angles Θ and α are equal so that the image projected onto the screen 125 (projected image 145) will not be subject to keystone distortion. A desirable range for angles α and Θ is normally between 12° and 15°, limited by the usable angle Θ of the projection lens 115.

The overhead projector of the present invention has considerable advantages over those of the prior art. The overhead projector utilizes an arrangement of optical components so that the center of its Fresnel lens is not positioned within the illuminated stage where the image to be projected is located. Thus, the spurious spot of light typically caused by the planar center of the Fresnel lens is not projected onto the screen. In addition, positioning the light source between the projection lens and tilt mirror assembly and the screen eliminates the specular reflection of the light source off of the planar surfaces of stage area to the user viewing the stage area. Also, the inventive overhead projector allows the projection angles to be maintained such that the projected image is free of keystone distortion.

Although the present invention has been described with reference to preferred embodiments, workers skilled in the art will recognize that changes may be made in form and detail without departing from the spirit and scope of the invention. For example, FIG. 3 shows the lamp 136 positioned on the screen side of the overhead projector 100. The bright spot problem that is addressed by eliminating the center 130 of the Fresnel lens from the reflective stage 120. With a Fresnel lens arrangement as shown in FIGS. 3 and 4, the lamp can be positioned on the other side of the projection lens and tilt mirror (as illustrated generally in FIGS. 1 and 2) and the bright spot will still be projected in a direction away from the projected image on the screen. This is not a preferred or recommended configuration for an overhead projector, but so long as the center of the Fresnel lens is out of the reflective stage, there will be no bright spot on the screen.

What is claimed is:

1. In an overhead projector having a surface for supporting an image to be projected, an overhead light source for illuminating the image on a reflective stage area of the surface and projection means for focusing and reflecting the illuminated image onto a screen, the improved which comprises:
defining the reflective stage area of the surface by a portion of a Fresnel lens wherein the lens has its optical center aligned out of and spaced from the reflective stage area of the surface.

2. The improved overhead projector of claim 1, wherein the light source is positioned between the projection means and the screen.

3. The improved overhead projector of claim 1, wherein the projection means is defined by an overhead projection lens and tilt mirror, with the projection lens positioned forwardly of a center of the stage area and with the tilt mirror aligned above the projection lens to direct the image from the stage area which passes through the projection lens toward the screen.

4. The improved overheard projector of claim 1, wherein the image is projected toward the projection means from the stage area at an angle from 12° to 15° relative to a line perpendicular to a center of the stage area.

5. The improved overhead projector of claim 4, wherein the image if further projected toward the screen from the projection means at an angle 12° to 15° relative to a line perpendicular to the screen.

6. The improved overhead projector of claim 1, wherein the center of the Fresnel lens is spaced from an edge of the stage area which is nearest the center of the Fresnel lens by no less than 20 mm.

7. An overhead projector comprising:
a surface for supporting an image to be projected from the projector, with the surface being defined by a generally rectangular portion of a Fresnel lens, said portion excluding and being spaced from an optical center of the Fresnel lens and said portion being centrally bisected by a line extending radially outwardly from said optical center;
an overhead light source for illuminating the image on the surface; and
projection means for focusing and directing the illuminated image from the surface onto a screen.

8. The overhead projector of claim 7 wherein the screen is positioned on a forward side of the overhead projector, and wherein the overhead light source is positioned forwardly of the projection means.

9. The improved overhead projector of claim 7, wherein the projection means is defined by an overhead projection lens and tilt mirror, with the projection lens positioned forwardly of a center of the stage area and with the tilt mirror align d above the projection lens to direct the image from the stage area which passes through the projection lens toward the screen.

10. The improved overheard projector of claim 7, wherein the image is projected toward the projection means from the stage area at an angle from 12° to 15° relative to a line perpendicular to a center of the stage 11. The improved overhead projector of claim 10, wherein the image if further projected toward the screen from the projection means at an angle 12° to 15° relative to a line perpendicular to the screen.

12. The improved overhead projector of claim 7, wherein the optical center of the Fresnel lens is spaced from a nearest edge of the surface by no less than 20 mm.

13. An overhead projector comprising:
a surface for supporting an image to be projected from the projector, with the surface being defined by a generally rectangular portion of a Fresnel lens which does not include an optical center of the lens, and with said portion being centrally bisected by a line extending radially outwardly from the optical center of the lens;
an overhead lamp to illuminate the image on the surface;
an overhead mirror and focusing lens assembly which directs light radiating from the surface onto a screen; and
positioning the lamp between the mirror and focusing lens assembly and the screen.

14. The improved overhead projector of claim 13, wherein the optical center of the Fresnel lens is spaced from a nearest edge of the surface by no less than 20 mm.

15. The improved overhead projector of claim 1, wherein the portion of the Fresnel lens defining the reflective stage area of the surface is equally bisected by a line extending radially outwardly from the optical center of the Fresnel lens.

16. The overhead projector of claim 13 wherein the portion of the Fresnel lens has an edge closet to, yet spaced from, the optical center of the lens, and said edge is aligned closest to the screen.

* * * * *

UNITED STATES PATENT AND TRADEMARK OFFICE
CERTIFICATE OF CORRECTION

PATENT NO. : 4,986,651

DATED : January 22, 1991

INVENTOR(S) : Dennis F. Vanderwerf

It is certified that error appears in the above-identified patent and that said Letters Patent is hereby corrected as shown below:

Col. 8, line 11, delete "align d", insert --aligned--.

Col. 8, line 17, after "stage", insert --area.--.

Signed and Sealed this

Thirtieth Day of June, 1992

Attest:

DOUGLAS B. COMER

*Attesting Officer*     Acting Commissioner of Patents and Trademarks